UNITED STATES PATENT OFFICE.

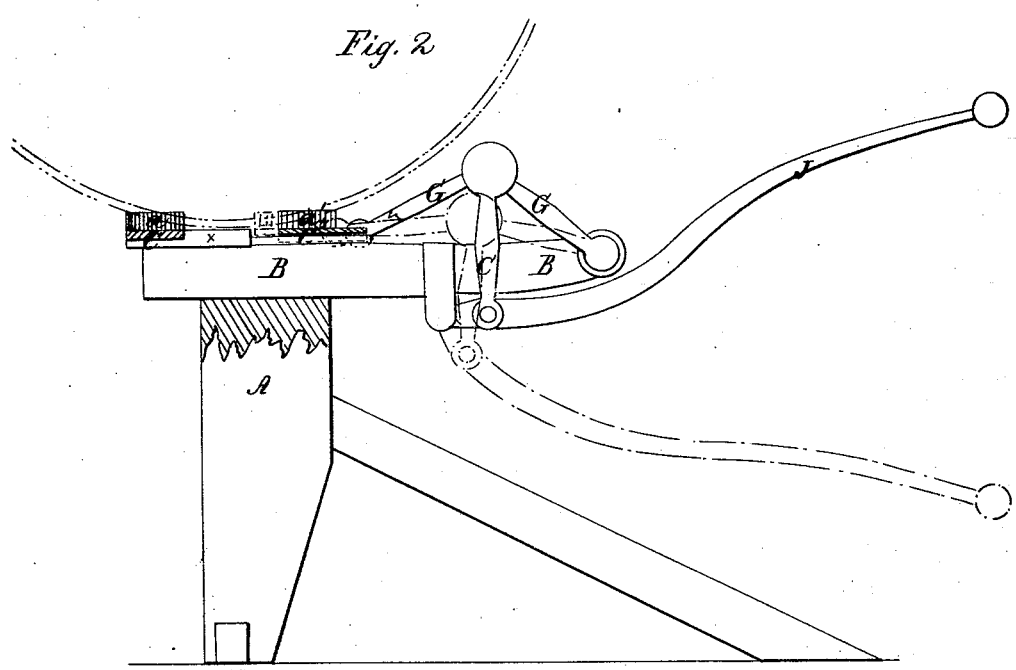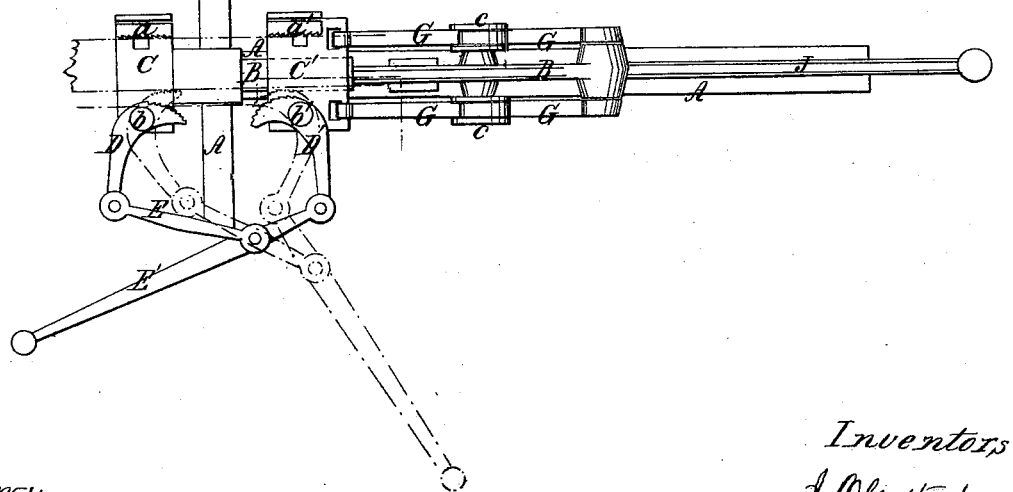

JOSEPH OLMSTED AND WILLIAM A. WALKER, OF VICTORIA, ILLINOIS.

MACHINE FOR UPSETTING TIRES.

Specification of Letters Patent No. 29,513, dated August 7, 1860.

*To all whom it may concern:*

Be it known that we, JOSEPH OLMSTED and WM. A. WALKER, both of Victoria, in the county of Knox and State of Illinois, have invented certain new and useful Improvements in Machinery for Upsetting Tires; and we do hereby declare that the following is a full, clear, and exact description thereof, reference being had to the accompanying drawings, making part of this specification, in which—

Figure 1 represents a plan view of the improved tire upsetting machine. Fig. 2 is a side sectional elevation of the machine.

Similar letters of reference indicate corresponding parts in both figures.

The object of this invention and improvement in upsetting tires is to enable the operator to work at the machine to a much greater advantage both as to time in one case and power in the other.

The invention consists in the employment of a horizontal stationary and movable bed-plate, on each of which is a fixed jaw, and a jointed dog or clamp which latter are operated by a jointed lever and connecting rod, which moves them up to the tire, simultaneously and causes each of them to clamp the tire with an equal pressure as will be hereinafter described; and it consists in combining with the movable bed plate, toggle jointed levers that are operated by a hand lever for upsetting the tire, as will be hereinafter described and represented.

To enable those skilled in the art to fully understand our invention we will proceed to describe its construction and operation.

A is a strong wooden stand in the top of which is inserted endwise a strong iron bar B, that projects some distance out from one side of the stand, A; and on this bar is fixed the stationary bed-plate C, and the movable bed-plate C', both of which plates project out from each side of the bar B. The sliding plate is kept down in place by a dovetail groove and tenon.

$a$, $a'$, are steel blocks, the necks of which pass through slots cut into the plates C, C'. These blocks are serrated on their inner faces, and they bear against the ends of the plates C, C', that are turned up for this purpose. The slots in the plates admit of their being laterally adjusted for tires of different widths.

D, D', are clamping levers or dogs that are jointed to the stationary and movable plates C, C', at $b$, $b'$. These two levers with the blocks $a$, $a$, form the jaws between which the tire to be shrunk is clamped, for which latter purpose they are operated by a long lever E', that is jointed to the long end of the dog D', and a connecting rod E, that is jointed to the dog D, and to the lever E'. The short ends of the dogs D, D', are rounded and serrated so that they will clamp and hold the tire rigidly against the blocks $a$, $a'$, during the operation of shrinking or upsetting it.

G, G, are toggle levers that are jointed respectively to the end of bar B, and the movable plate C'. These levers are operated by a long hand lever J, and the connecting rods $c$, giving a forward and receding movement to the plate C', and consequently to the block $a'$, and dog D, that are attached to this plate.

From this description it will be seen that the first operation necessary in upsetting a tire, is to place the tire down flat on the bed plates C, C', and raise the lever J, so as to separate the dogs D, D', and blocks $a$, $a'$, then after adjusting these blocks $a$, $a'$, properly the tire is firmly clamped by forcing up the two dogs with the lever E, after which the operation of compressing or upsetting the tire is performed by bearing down hard on lever J, which forces the plates C, C', together.

Having thus described our invention what we claim as new and desire to secure by Letters Patent, is—

The combination with the stationary and movable plates C, C', and their blocks $a$, $a'$, and jointed dogs D, D', with the lever and connecting rod E, E', and the hand lever and toggle jointed levers J, G, G'; all arranged and operating conjointly in the manner and for the purposes herein set forth.

JOSEPH OLMSTED.
WILLIAM A. WALKER.

Witnesses:
P. C. BOWEN,
HORACE TIFFANY.